(12) United States Patent
He et al.

(10) Patent No.: US 9,407,339 B2
(45) Date of Patent: Aug. 2, 2016

(54) MONOTONIC OPTIMIZATION METHOD FOR ACHIEVING THE MAXIMUM WEIGHTED SUM-RATE IN MULTICELL DOWNLINK MISO SYSTEMS

(71) Applicant: SHANGHAI JIAO TONG UNIVERSITY, Shanghai (CN)

(72) Inventors: Chen He, Shanghai (CN); Qian Zhang, Shanghai (CN); Lingge Jiang, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 14/429,780

(22) PCT Filed: Nov. 26, 2012

(86) PCT No.: PCT/CN2012/001585
§ 371 (c)(1),
(2) Date: Mar. 20, 2015

(87) PCT Pub. No.: WO2014/043834
PCT Pub. Date: Mar. 27, 2014

(65) Prior Publication Data
US 2015/0222334 A1    Aug. 6, 2015

(30) Foreign Application Priority Data

Sep. 24, 2012 (CN) .......................... 2012 1 0359384

(51) Int. Cl.
*H04B 15/00* (2006.01)
*H04B 7/04* (2006.01)
*G06Q 50/32* (2012.01)
*H04B 7/06* (2006.01)
*H04B 7/02* (2006.01)

(52) U.S. Cl.
CPC .............. *H04B 7/0413* (2013.01); *G06Q 50/32* (2013.01); *H04B 7/024* (2013.01); *H04B 7/0617* (2013.01)

(58) Field of Classification Search
CPC .............. H04L 27/2647; H04L 5/0007; H04L 27/2657; H04L 27/2662; H04L 5/0048; H04L 27/368; H04L 25/03343; H03F 1/3247; H03F 1/3294; H03F 2201/3233
USPC ................. 375/140–153, 224–228, 259–285, 375/295–299
See application file for complete search history.

(56) References Cited

U.S. PATENT DOCUMENTS

| | | | | |
|---|---|---|---|---|
| 8,792,573 B2* | 7/2014 | Kim | ..................... | H04B 7/0404 375/261 |
| 8,797,959 B2* | 8/2014 | Razaviyayn | ........... | H04B 7/086 370/328 |
| 8,861,637 B2* | 10/2014 | Na | ..................... | H04L 25/03343 375/232 |
| 9,124,313 B2* | 9/2015 | Ko | .......................... | H04B 7/024 |
| 2003/0064744 A1* | 4/2003 | Zhang et al. | ................... | 455/522 |
| 2008/0298486 A1* | 12/2008 | Venturino et al. | ............. | 375/260 |
| 2009/0296650 A1* | 12/2009 | Venturino et al. | ............. | 370/330 |
| 2010/0054212 A1* | 3/2010 | Tang | ............................ | 370/335 |
| 2011/0243207 A1* | 10/2011 | Tang et al. | ...................... | 375/224 |
| 2012/0170677 A1* | 7/2012 | Venturino | ............. | H04W 16/28 375/267 |
| 2013/0170366 A1* | 7/2013 | Prasad et al. | ................... | 370/252 |
| 2013/0336233 A1* | 12/2013 | Kim | ..................... | H04B 7/0452 370/329 |
| 2014/0056204 A1* | 2/2014 | Suh | ................... | H04W 72/1226 370/312 |
| 2014/0112272 A1* | 4/2014 | Ro | ........................ | H04W 24/02 370/329 |
| 2014/0146756 A1* | 5/2014 | Sahin | .................... | H04L 1/0025 370/329 |
| 2015/0023442 A1* | 1/2015 | Garcia Armada et al. | .... | 375/267 |
| 2015/0030007 A1* | 1/2015 | Zhang | ................ | H04L 25/0204 370/336 |

* cited by examiner

Primary Examiner — James M Perez

(57) ABSTRACT

A monotonic optimization method is for achieving the maximum weighted sum-rate in multicell downlink MISO systems. It belongs to the wireless communications field. The weighted sum-rate maximization is viewed as a monotonic optimization problem over the achievable rate region. A sensible search scheme, a sequential partition method as well as a vertex relocation method are designed to reduce the complexity and accelerate the convergence.

4 Claims, 2 Drawing Sheets

MONOTONIC OPTIMIZATION METHOD FOR ACHIEVING THE MAXIMUM WEIGHTED SUM-RATE IN MULTICELL DOWNLINK MISO SYSTEMS

CROSS REFERENCE OF RELATED APPLICATION

This is a U.S. National Stage under 35 U.S.C 371 of the International Application PCT/CN2012/001585, filed Nov. 26, 2012, which claims priority under 35 U.S.C. 119(a-d) to CN 201210359384.7, filed Sep. 24, 2012.

BACKGROUND OF THE PRESENT INVENTION

1. Field of Invention

The present invention describes a monotonic optimization method for achieving the maximum weighted sum-rate in multicell downlink MISO systems, which is a technique of wireless communications.

2. Description of Related Arts

Coordinated multicell downlink transmission is a promising technique for suppressing co-channel interference and improving the system performance. Among the different kinds of design criteria, weighted sum-rate maximization is an active research topic, which has attracted significant attention from both academics and industries. However, achieving the global optimum is very difficult as the capacity region remains unknown. A more pragmatic method that adopts single-user detection by simply treating interference as noise has stimulated some efficient algorithms.

In the conventional techniques, the reference L. Venturino, N. Prasad, and X. Wang, "*Coordinated linear beamforming in downlink multi-cell wireless networks,*" *IEEE Transactions on Wireless Communications*, vol. 9, no. 4, pp. 1451-1461, April 2010, presents an iterative coordinated beamforming algorithm to solve the Karush-Kuhn-Tucker conditions of the weighted sum-rate maximization problem.

The reference Q. J. Shi, M. Razaviyayn, Z. Q. Luo, and C. He, "*An iteratively weighted MMSE approach to distributed sum-utility maximization for a MIMO interfering broadcast channel,*" *IEEE Transactions on Signal Processing*, vol. 59, no. 9, pp. 4331-4340, September 2011, proposes a weighted minimum mean square error method which iteratively update the transmitter, the receiver and the weight matrix.

However, the achievable rate region under single-user detection remains non-convex. For MISO systems, the reference R. Zhang and S. G. Cui, "*Cooperative interference management with MISO beamforming,*" *IEEE Transactions on Signal Processing*, vol. 58, no. 10, pp. 5454-5462, October 2010, proves that beamforming techniques can achieve the Pareto-optimal points and describes a method to characterize the Pareto-boundary of the achievable rate region. Although there are already some techniques obtaining Pareto-optimal solutions, it is still a big challenge to search for the global optimality.

The reference L. Liu, R. Zhang, and K. Chua, "*Achieving global optimality for weighted sum-rate maximization in the K-user Gaussian interference channel with multiple antennas,*" *IEEE Transactions on Wireless Communications*, vol. 11, no. 5, pp. 1933-1945, 2012, views the weighted sum-rate maximization as a monotonic optimization problem and adopts the outer polyblock approximation algorithm combined with the rate profile technique to approaching the global optimal solution. To improve the efficiency of the monotonic optimization, another reference E. Bjornson, G. Zheng, M. Bengtsson, and B. Ottersten, "*Robust monotonic optimization framework for multicell MISO systems,*" *IEEE Transactions on Signal Processing*, vol. 60, no. 5, pp. 2508-2523, 2012, provides a branch-reduce-and-bound based method. Although it converges faster than the outer polyblock approximation algorithm, it still needs too many iterations as the number of users increase.

SUMMARY OF THE PRESENT INVENTION

Based on the conventional techniques, the present invention proposes a novel monotonic optimization method to achieve the maximum weighted sum-rate in multicell downlink MISO systems. The present invention utilizes a sensible search scheme, a sequential partition method and a vertex relocation method to accelerate the convergence.

The present invention is implemented as the following steps of:

Step 1: setting system parameters comprising: a cell/base station number M, a user number in an m-th cell $K_m$, an antenna number of an m-th base station $T_m$, a maximum transmission power of the m-th base station $P_m$, wherein $m=1,\ldots,M$, a 1 by $T_n$ channel vector from a n-th base station to an $m_k$-th user (i.e. the k-th user in the m-th cell) $h_{m_k,n}$, wherein $m,n=1, \ldots, M$, $k=1, \ldots, K_m$, a variance of a zero-mean complex Gaussian additive noise at the $m_k$-th user $\sigma_{m_k}^2$, a weight of the $m_k$-th user $\alpha_{m_k}$, wherein $m=1,\ldots,M$, $k=1,\ldots,K_m$;

Step 2: defining $R_{m_k}$ as a rate of the $m_k$-th user, $$R_{m_k} = \log_2\left(1 + \frac{|h_{m_k,m}w_{m_k}|^2}{\sum_{(n,j)\neq(m,k)}|h_{m_k,n}w_{n_j}|^2 + \sigma_{m_k}^2}\right)$$

wherein $w_{m_k}$ is the $T_m$ by 1 beamformer for the $m_k$-th user, wherein $m=1,\ldots,M$, $k=1,\ldots,K_m$;

formulating a achievable rate vector $$r = (R_{1_1}, \ldots, R_{1_{K_1}}, \ldots, R_{M_1}, \ldots, R_{M_{K_M}}) \in \mathbb{R}_+^K$$

as well as a weighted sum-rate function $$f(r) = \sum_{m,k} \alpha_{m_k} R_{m_k},$$

wherein $\in \mathbb{R}_+^K$ indicates that r is a positive real vector of a length K with $K=\Sigma_{m=1}^M K_m$;

Step 3: defining a box $[a,b]=\{x \in \mathbb{R}_+^K | a \leq x \leq b\}$; initializing the set of boxes as $=\{[0,b_0]\}$; assuming $K_0=0$, a $(\Sigma_{i=0}^{m-1}K_i + k)$-th element (associated with the $m_k$-th user) of $b_0$ is $\log_2(1+P_m\|h_{m_k,m}^H\|^2/\sigma_{m_k}^2)$, wherein $m=1,\ldots$, $k=1,\ldots,K_m$; setting a termination accuracy $\eta$ and a line search accuracy $\delta$;

Step 4: initializing an upper bound $f_{max}$ and a lower bound $f_{min}$ of the weighted sum-rate, wherein $$f_{max}=f(b_0), f_{min}=\max(\alpha \cdot b_0)$$

wherein α is a weight vector comprising weights for all the users, i.e.

$$\alpha = (\alpha_{1_1}, \ldots, \alpha_{1_{K_1}}, \ldots, \alpha_{M_1}, \ldots, \alpha_{M_{K_M}}) \in \mathbb{R}_+^K;$$

Step 5: choosing a box [a,b] from that satisfies $f(b)=f_{max}$, and then checking feasibility of a: whether a locates in a achievable rate region or not; wherein the feasibility is determined via a problem $\phi(a)$;

the specified problem $\phi(a)$ is:
maximize 0
subject to $\sqrt{\beta_{m_k}}\|A_{m_k}x + n_{m_k}\| \leq \sqrt{1+\beta_{m_k}}(h_{m_k,m}S_{m_k}x), \forall m,k$
$p^T x = 0$
$\|G_m x\| \leq \sqrt{P_m}, \forall m$ with the following notations $$x_m = [w_{m_1}^H, \ldots, w_{m_{K_m}}^H]^H, m = 1, \ldots, M,$$

$$x = [x_1^H, \ldots, x_M^H, 0]^H, n_{m_k} = [0, \ldots 0, \sigma_{m_k}]^T,$$

$$S_{m_k} = [0\ 0\ \ldots I_{T_m} \ldots 0],$$

$$A_{m_k} = diag\left(\underbrace{h_{m_k,1}, \ldots, h_{m_k,1}}_{K_1}, \ldots, \underbrace{h_{m_k,M}, \ldots, h_{m_k,M}}_{K_M}, 0\right),$$

$$G_m = [S_{m_1}^H \ldots S_{m_{K_m}}^H]^H, \beta_{m_k} = 2^{\alpha_{m_k}} - 1, p = [0, \ldots 0, 1]^T$$

wherein $\sigma_{m_k}$ is a standard deviation of the zero-mean complex Gaussian additive noise at the $m_k$-th user, $I_{T_m}$ denotes a identity matrix with dimension $T_m$;

Step 6: if the problem $\phi(a)$ is feasible, conducting a sensible search scheme for the box [a,b] to obtain a partition point r;

wherein if the problem $\phi(a)$ is infeasible, updating the box set as $=\backslash[a,b]$ and calculating the upper bound $f_{max}=max_{[a,b]} \epsilon f(b)$, then going back to the Step 5;

the sensible search scheme is:
denoting $l_{ab}$ as the line connecting a and b; finding the intersection point c on the hyperplane $\{r|f(r)=f_{min}\}$ with the line $l_{ab}$, i.e.

$$c = a + (b-a) \times \frac{f_{min} - f(a)}{f(b-a)}$$

checking feasibility of c via the problem $\phi(a)$ in the Step 5 with a=c;

wherein if $\phi(c)$ is feasible, a bisection line search is conducted along the line $l_{cb}$ to obtain an intersection point on a Pareto-boundary; given a line search accuracy δ, two points $r_{min}$ and $r_{max}$ are acquired; the partition point is set as $r=r_{max}$ while the lower bound is updated as $f_{min}=f(r_{min})$;

if $\phi(c)$ is infeasible, just set the partition point as r=c;

Step 7: based on the partition point r, dividing the box [a,b] into K new boxes $[a^{(i)}, b^{(i)}]$, i=1, . . . , K using a sequential partition method; then updating the boxes set as $$= \backslash [a,b] \cup \left\{\bigcup_{i=1,\ldots,K} [a^{(i)}, b^{(i)}]\right\}$$

the sequential partition method is:

i) firstly generating a set of K new vertices $\{b^{(1)}, \ldots, b^{(K)}\}$ based on the partition point r, wherein $$b^{(i)} = b - (b_i - r_i)e_i, i=1, \ldots, K$$

wherein the subscript i indicates the i-th element of the vector and $e_i$ is a vector with the i-th element being 1 and the others being 0;

ii) sorting the K vertices as $\{b^{(i_1)}, \ldots, b^{(i_K)}\}$ in ascending order of the achievable weighted sum-rate, wherein $i_s$ denotes an original index of the s-th vertex;

iii) sequentially determining the corresponding vertices $\{a^{(i_1)}, \ldots, a^{(i_K)}\}$ as $$a^{(i_s)} = \begin{cases} a, & s=1 \\ a^{(i_{s-1})} + (r_{i_{s-1}} - a_{i_{s-1}})e_{i_{s-1}}, & s>1 \end{cases};$$

Step 8: calculating f(b) for each box [a,b];
wherein if $f(b) > f_{min}$, the associated vertex a is relocated as $$\tilde{a}_i = b_i - min\left(\frac{f(b) - f_{min}}{\alpha_i(b_i - a_i)}, 1\right) \times (b_i - a_i), i=1, \ldots, K$$

wherein, $\tilde{a}_i$ is an i-th element of the relocated vertex;

if $f(b) \leq f_{min}$, the box [a,b] is removed from the box set, i.e. $=\backslash[a,b]$;

Step 9: resetting the upper bound $f_{max}$ as $f_{max}=max_{[a,b]} \epsilon f(b)$; and Step 10: checking a relative error of the upper and lower bound;

wherein if $(f_{max}-f_{min})/f_{min} > \eta$, going back to the Step 5, otherwise, returning $f_{max}$ and $r_{min}$ The monotonic optimization method proposed in the present invention adopts a sensible search scheme, a sequential partition method and a vertex relocation method to reduce the number of checking feasibility, therefore the computational complexity is decreased and the convergence is accelerated.

DETAILED DESCRIPTION OF THE PREFERRED EMBODIMENT

Figure 1:
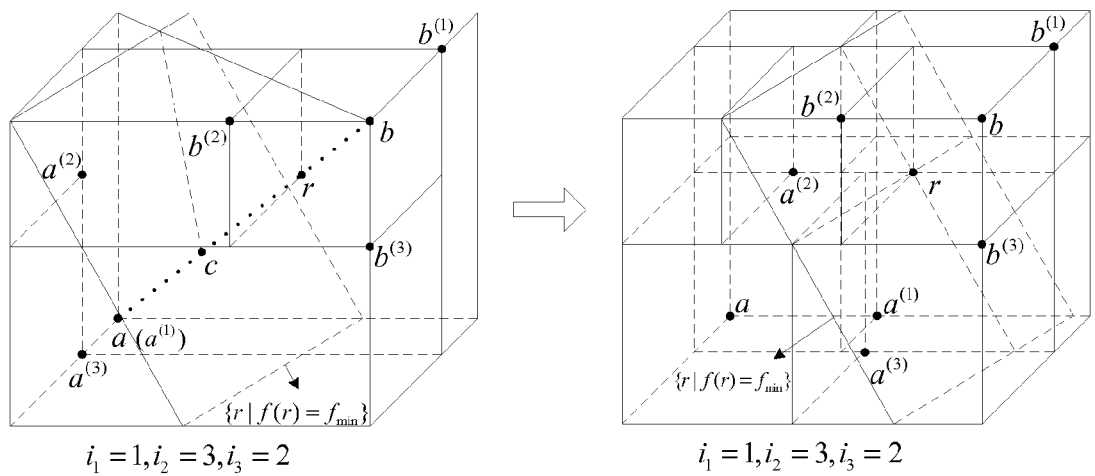
FIG. 1 is an illustration of an iteration for K=3.

The details of the embodiment of the present invention are specified below. The embodiment is based on the technical content of the present invention. The specific implementing process is presented. The scope of the present invention is not limited to the following embodiment.

A weighted sum-rate maximization problem is $$\text{maximize} \sum_{m,k} \alpha_{m_k} R_{m_k} = \sum_{m,k} \alpha_{m_k} \log_2\left(1 + \frac{|h_{m_k,m} w_{m_k}|^2}{\sum_{(n,j) \neq (m,k)} |h_{m_k,n} w_{n_j}|^2 + \sigma_{m_k}^2}\right)$$

$$\text{subject to} \sum_{k=1}^{K_m} \|w_{m_k}\|^2 \leq P_m, \forall m$$

wherein $K_m$ is a number of users in an m-th cell, $T_m$ is an antenna number of an m-th base station, $P_m$ denotes a maximum transmission power of the m-th base station, $h_{m_k,n}$ is channel vector from a n-th base station to an $m_k$-th user, $\sigma_{m_k}^2$ represents a variance of a zero-mean complex Gaussian additive noise at the $m_k$-th user and $\alpha_{m_k}$ is a weight of the $m_k$-th user, wherein m,n=1, ..., M, k=1, ..., $K_m$;

The monotonic optimization problem is $$\text{maximize } f(r) := \sum_{m,k} \alpha_{m_k} R_{m_k}$$

$$\text{subject to } r \in \mathcal{R}$$

wherein $$r = (R_{1_1}, \ldots, R_{1_{K_1}}, \ldots, R_{M_1}, \ldots, R_{M_{K_M}}) \in \mathbb{R}_+^K$$

is the achievable rate vector and $\mathcal{R}$ denotes the achievable rate region, i.e.

$$\mathcal{R} = \bigcup_{\sum_{k=1}^{K_m} \|w_{m_k}\|^2 \leq P_m, \forall m} \{(r_{1_1}, \ldots, r_{M_{K_M}}) \mid 0 \leq r_{m_k} \leq R_{m_k}, \forall m, k\}$$

The present invention includes the following steps of:

Step 1: setting system parameters comprising: a cell/base station number M, the user number in the m-th cell $K_m$, the antenna number of the m-th base station $T_m$, the maximum transmission power of the m-th base station $P_m$, wherein m=1, ..., M, a 1 by $T_n$ channel vector from the n-th base station to the $m_k$-th user (i.e. the k-th user in the m-th cell) $h_{m_k,n}$, wherein m,n=1, ..., M, k=1, ..., $K_m$, the variance of the zero-mean complex Gaussian additive noise at the $m_k$-th user $\sigma_{m_k}^2$, the weight of the $m_k$-th user $\alpha_{m_k}$, wherein m=1, ..., M, k=1, ..., $K_m$;

In this embodiment, two scenarios are considered: M=3, $K_m$=1, $P_m$=5, $T_m$=4 and M=2, $K_m$=2, $P_m$=10, $T_m$=4, wherein m=1, ..., M.

In this embodiment, every entry of $h_{m_k,n}$ is a zero-mean unit-variance complex Gaussian random variable, $\sigma_{m_k}^2$=1, $\alpha_{m_k}$=1, wherein m,n=1, ..., M, k=1, ..., $K_m$.

Step 2: defining $R_{m_k}$ as a rate of the $m_k$-th user, $$R_{m_k} = \log_2\left(1 + \frac{|h_{m_k,m} w_{m_k}|^2}{\sum_{(n,j) \neq (m,k)} |h_{m_k,n} w_{n_j}|^2 + \sigma_{m_k}^2}\right)$$

wherein $W_{m_k}$ is the $T_m$ by 1 beamformer for the $m_k$-th user, wherein m=1, ..., M, k=1, ..., $K_m$;

formulating a achievable rate vector $$r = (R_{1_1}, \ldots, R_{1_{K_1}}, \ldots, R_{M_1}, \ldots, R_{M_{K_M}}) \in \mathbb{R}_+^K$$

as well as a weighted sum-rate function $$f(r) = \sum_{m,k} \alpha_{m_k} R_{m_k},$$

wherein $\in \mathbb{R}_+^K$ indicates that r is a positive real vector of a length K with $K = \sum_{m=1}^M K_m$;

Step 3: defining a box [a,b]={$x \in \mathbb{R}_+^K | a \leq x \leq b$}; initializing the set of boxes as ={[0,$b_0$]}; assuming $K_0$=0, a ($\sum_{i=0}^{m-1} K_i$+ k)-th element (associated with the $m_k$-th user) of $b_0$ is $\log_2(1 + P_m \|h_{m_k,m}^H\|^2/\sigma_{m_k}^2)$, wherein m=1, ..., k=1, ..., $K_m$; setting a termination accuracy η and a line search accuracy δ;

In this embodiment, the accuracy parameters are set as η=0.01, δ=0.01.

Since the iterations of the embodiment and the conventional methods are different, it is not meaningful to compare the number of iterations. As the main complexity derives from checking the feasibility of a point, the convergence performance is evaluated as a function of the feasibility checking times. The convergence performance is presented via the relative errors of the upper and lower bound with the optimal value, i.e.

$$(f_{max} - f_{opt})/f_{opt}, (f_{min} - f_{opt})/f_{opt}$$

wherein $f_{opt}$ is the obtained optimal value of the weighted sum-rate;

Step 4: initializing an upper bound $f_{max}$ and a lower bound $f_{min}$ of the weighted sum-rate, wherein $$f_{max} = f(b_0), f_{min} = \max(\alpha \cdot b_0)$$

wherein α is a weight vector comprising weights for all the users, i.e.

$$\alpha = (\alpha_{1_1}, \ldots, \alpha_{1_{K_1}}, \ldots, \alpha_{M_1}, \ldots, \alpha_{M_{K_M}}) \in \mathbb{R}_+^K;$$

Step 5: choosing a box [a,b] from that satisfies $f(b) = f_{max}$, and then checking feasibility of a: whether a locates in a achievable rate region or not; wherein the feasibility is determined via a problem φ(a);

the specified problem φ(a) is:
maximize 0
subject to $\sqrt{\beta_{m_k}} \|A_{m_k} x + n_{m_k}\| \leq \sqrt{1+\beta_{m_k}} (h_{m_k,m} S_{m_k} x), \forall m,k$
$p^T x = 0$
$\|G_m x\| \leq \sqrt{P_m}, \forall m$ with the following notations $$x_m = [w_{m_1}^H, \ldots, w_{m_{K_m}}^H]^H, m = 1, \ldots, M,$$

$$x = [x_1^H, \ldots, x_M^H, 0]^H, n_{m_k} = [0, \ldots 0, \sigma_{m_k}]^T,$$

$$S_{m_k} = [0 \ 0 \ \ldots \ I_{T_m} \ \ldots 0],$$

-continued $$A_{m_k} = diag\left(\underbrace{h_{m_k,1},\ldots,h_{m_k,1}}_{K_1},\ldots,\underbrace{h_{m_k,M},\ldots,h_{m_k,M}}_{K_M},0\right),$$

$$G_{m_1} = [S_{m_1}^H \ldots S_{m_{K_m}}^H]^H, \beta_{m_k} = 2^{a_{m_k}} - 1, p = [0, \ldots 0, 1]^T$$

wherein $\sigma_{m_k}$ is a standard deviation of the zero-mean complex Gaussian additive noise at the $m_k$-th user, $I_{T_m}$ denotes a identity matrix with dimension $T_m$;

Step 6: if the problem $\phi(a)$ is feasible, conducting a sensible search scheme for the box [a,b] to obtain a partition point r;

wherein if the problem $\phi(a)$ is infeasible, updating the box set as $=\backslash[a,b]$ and calculating the upper bound $f_{max}=\max_{[a,b]}\epsilon f(b)$, then going back to the Step 5;

the sensible search scheme is:

denoting $l_{ab}$ as the line connecting a and b; finding the intersection point c on the hyperplane $\{r|f(r)=f_{min}\}$ with the line $l_{ab}$, i.e.

$$c = a + (b-a) \times \frac{f_{min} - f(a)}{f(b-a)}$$

checking feasibility of c via the problem $\phi(a)$ in the Step 5 with a=c;

wherein if $\phi(c)$ is feasible, a bisection line search is conducted along the line $l_{cb}$ to obtain an intersection point on a Pareto-boundary; given a line search accuracy $\delta$, two points $r_{min}$ and $r_{max}$ are acquired; the partition point is set as $r=r_{max}$ while the lower bound is updated as $f_{min}=f(r_{min})$;

if $\phi(c)$ is infeasible, just set the partition point as r=c;

Step 7: based on the partition point r, dividing the box [a,b] into K new boxes $[a^{(i)},b^{(i)}]$, $i=1,\ldots,K$ using a sequential partition method; then updating the boxes set as $$=\backslash[a,b] \cup \left\{ \bigcup_{i=1,\ldots,K} [a^{(i)}, b^{(i)}] \right\}$$

the sequential partition method is:

i) firstly generating a set of K new vertices $\{b^{(1)},\ldots,b^{(K)}\}$ based on the partition point r, wherein $$b^{(i)} = b - (b_i - r_i)e_i, i=1,\ldots,K$$

wherein the subscript i indicates the i-th element of the vector and $e_i$ is a vector with the i-th element being 1 and the others being 0;

ii) sorting the K vertices as $\{b^{(i_1)},\ldots,b^{(i_K)}\}$ in ascending order of the achievable weighted sum-rate, wherein $i_s$ denotes an original index of the s-th vertex;

iii) sequentially determining the corresponding vertices $\{a^{(i_1)},\ldots,a^{(i_K)}\}$ as $$a^{(i_s)} = \begin{cases} a, & s=1 \\ a^{(i_{s-1})} + (r_{i_{s-1}} - a_{i_{s-1}})e_{i_{s-1}}, & s>1 \end{cases};$$

Step 8: calculating f(b) for each box [a,b];

wherein if $f(b)>f_{min}$, the associated vertex a is relocated as $$\tilde{a}_i = b_i - \min\left(\frac{f(b)-f_{min}}{\alpha_i(b_i - a_i)}, 1\right) \times (b_i - a_i), i=1,\ldots,K$$

wherein $\tilde{a}_i$ is an i-th element of the relocated vertex;

if $f(b) \leq f_{min}$ the box [a,b] is removed from the box set, i.e. $=\backslash[a,b]$;

Step 9: resetting the upper bound $f_{max}$ as $f_{max}=\max_{[a,b]}f(b)$; and

Step 10: checking a relative error of the upper and lower bound;

wherein if $(f_{max}-f_{min})/f_{min}>\eta$, going back to the Step 5, otherwise, returning $f_{min}$, $f_{max}$ and $r_{min}$.

Figure 2:
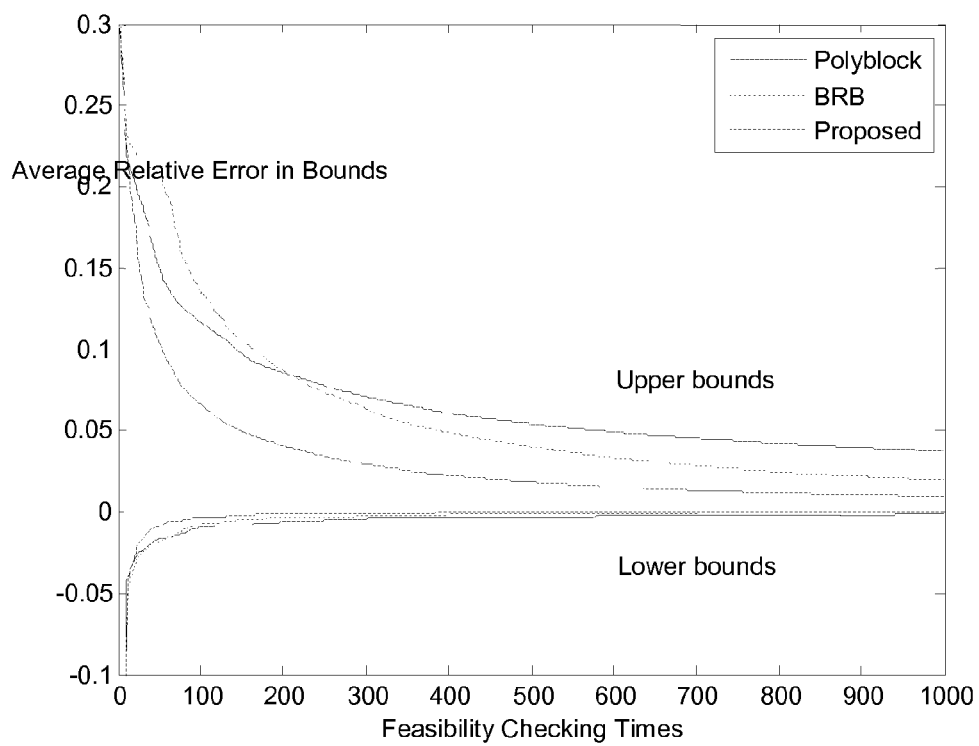
FIG. 2 is a diagram of comparison of convergence performance of the embodiment of the present invention, the conventional outer polyblock approximation method and branch-reduce-and-bound method in the scenario wherein M=3, $K_m=1$, $P_m=5$, $T_m=4$.
Figure 3:
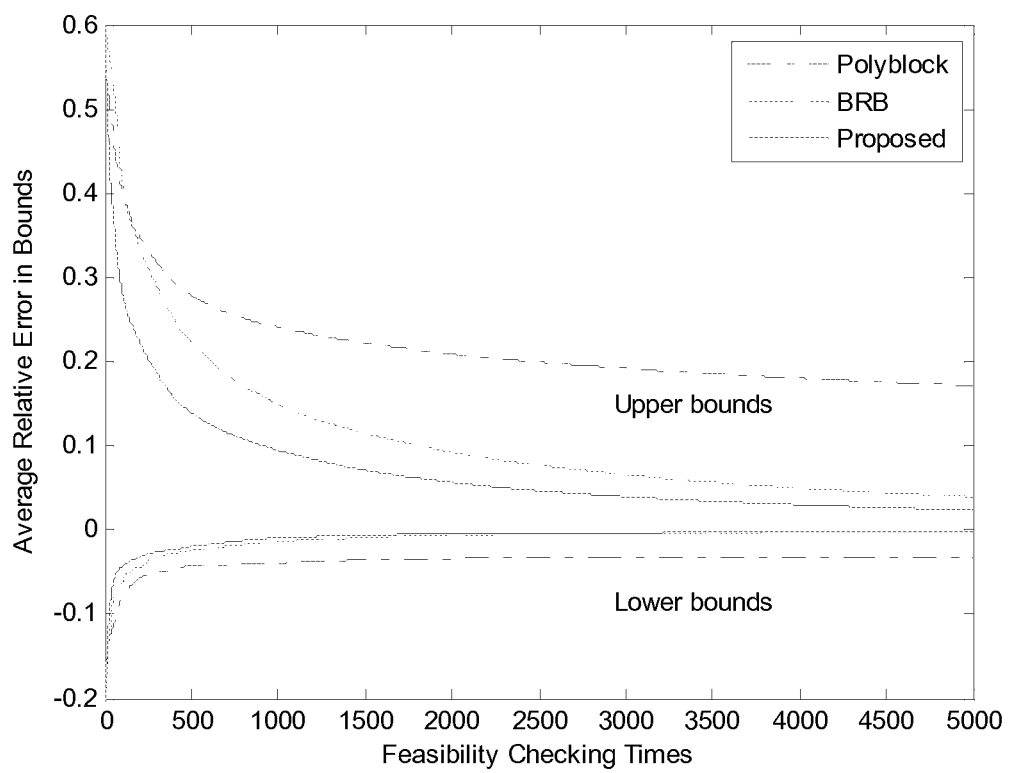
FIG. 3 is a diagram of comparison of convergence performance of the embodiment of the present invention, the conventional outer polyblock approximation method and branch-reduce-and-bound method in the scenario wherein M=2, $K_m=2$, P=10, $T_m=4$

FIG. 2 compares the convergence performance of the embodiment of the present invention, the conventional outer polyblock approximation method (refer to Polyblock in figure) and branch-reduce-and-bound method (refer to BRB in figure) in the scenario wherein M=3, $K_m$=1, $P_m$=5, $T_m$=4;

FIG. 3 compares the convergence performance of the embodiment of the present invention, the conventional outer polyblock approximation method (refer to Polyblock in figure) and branch-reduce-and-bound method (refer to BRB in figure) in the scenario wherein M=2, $K_m$=2, $P_m$=10, $T_m$=4.

From FIGS. 2 and 3, it is observed that the embodiment of the present invention converges and achieves the global optimal solution faster compared with the conventional methods.

While only selected embodiment has been chosen to illustrate the present invention, it will be apparent to those skilled in the art from this disclosure that various changes and modifications can be made herein without departing from the scope of the present invention.

What is claimed is:

1. A monotonic optimization method for achieving a maximum weighted sum-rate in a multicell downlink MISO system, wherein the multicell downlink MISO system comprises: cell/base stations, cells, antennas and base stations; the method utilizes a sensible search scheme, a sequential partition method and a vertex relocation method, specifically comprising steps of:

Step 1: setting system parameters by the base stations, wherein the system parameters comprises: a cell/base station number M, a user station number in an m-th cell $K_m$ detected by the base stations, an antenna number of an m-th base station $T_m$, a maximum transmission power of the m-th base station $P_m$, wherein m=1,...,M, a 1 by $T_n$ channel vector from a n-th base station to an $m_k$-th user station $h_{m_k,n}$, wherein m,n=1,...,M, k=1,...,$K_m$, a variance of a zero-mean complex Gaussian additive noise at the $m_k$-th user station $\sigma_{m_k}^2$, a weight of the $m_k$-th user station $\alpha_{m_k}$, wherein m=1,...,M, k=1,...,$K_m$;

Step 2: defining $R_{m_k}$ as a rate of the $m_k$-th user station in the base stations, $$R_{m_k} = \log_2\left(1 + \frac{|h_{m_k,m}w_{m_k}|^2}{\sum_{(n,j) \neq (m,k)} |h_{m_k,n}w_{n_j}|^2 + \sigma_{m_k}^2}\right)$$

wherein $W_{m_k}$ is the $T_m$ by 1 beamformer for the $m_k$-th user station, wherein m=1, ..., M, k=1, ..., $K_m$;
formulating an achievable rate vector $$r = (R_{1_1}, \ldots, R_{1_{K_1}}, \ldots, R_{M_1}, \ldots, R_{M_{K_M}}) \in \mathbb{R}_+^K$$

as well as a weighted sum-rate function $$f(r) = \sum_{m,k} \alpha_{m_k} R_{m_k},$$

wherein $\in \mathbb{R}_+^K$ indicates that r is a positive real vector of a length K with $K = \sum_{m=1}^M K_m$;

Step 3: defining boxes [a,b]={$x \in \mathbb{R}_+^K$ | a≤x≤b} in the base stations; initializing a box set as N={[0,$b_0$]}; assuming $K_0=0$, a $(\sum_{i=0}^{m-1} K_i + k)$-th element (associated with the $m_k$-th user station) of $b_0$ is $\log_2(1+P_m \|h_{m_k,m}^H\|^2 / \sigma_{m_k}^2)$, wherein m=1, ..., M, k=1, ..., $K_m$; setting a termination accuracy η and a line search accuracy δ;

Step 4: initializing an upper bound $f_{max}$ and a lower bound $f_{min}$ of the weighted sum-rate by the base stations, wherein $f_{max}=f(b_0), f_{min}=\max(\alpha \cdot b_0)$ wherein α is a weight vector comprising weights for all user stations, $$\alpha = (\alpha_{1_1}, \ldots, \alpha_{1_{K_1}}, \ldots, \alpha_{M_1}, \ldots, \alpha_{M_{K_M}}) \in \mathbb{R}_+^K;$$

Step 5: choosing one of the boxes [a,b] from N that satisfies $f(b)=f_{max}$ by the base stations, and then checking feasibility of a : whether a locates in an achievable rate region or not; wherein the feasibility is determined via a problem φ(a);

Step 6: if the problem φ(a) is feasible, conducting the sensible search scheme for the one of the boxes [a,b] to obtain a partition point r ;
wherein if the problem φ(a) is infeasible, updating the box set as N=N\[a,b] and calculating the upper bound $f_{max}=\max_{[a,b]\in N} f(b)$, then going back to the Step 5;

Step 7: based on the partition point r, dividing the the one of the boxes [a,b] into K new boxes [$a^{(i)}, b^{(i)}$], i=1, ..., K using the sequential partition method; then updating the box set as $$\mathcal{N} = \mathcal{N}\backslash[a,b] \cup \left\{ \bigcup_{i=1,\ldots,K} [a^{(i)}, b^{(i)}] \right\}$$

Step 8: calculating f(b) for each of the boxes [a,b];
wherein if $f(b) > f_{min}$, an associated vertex a is relocated as $$\tilde{a}_i = b_i - \min\left(\frac{f(b) - f_{min}}{\alpha_i(b_i - a_i)}, 1\right) \times (b_i - a_i), i = 1, \ldots, K$$

wherein $\tilde{a}_i$ is an i-th element of a relocated vertex;
if $f(b) \leq f_{min}$, the boxes [a,b] is removed from the box set N, i.e. N=N\[a,b];

Step 9: resetting the upper bound $f_{max}$ as $f_{max}=\max_{[a,b]\in N} f(b)$ by the base stations;

Step 10: checking a relative error of the upper and lower bounds by the base stations;
wherein if $(f_{max}-f_{min})/f_{min} > \eta$, going back to the Step 5, otherwise, returning $f_{min}$, $f_{max}$ and $r_{min}$; and Step 11: downlink-communicating with the user stations by the base stations at the defined rates within the upper bound $f_{max}$ and the lower bound $f_{min}$ obtained in the Step 10.

2. The monotonic optimization, as recited in claim 1, wherein the problem φ(a) in the Step 5 is:
maximize 0
subject to $\sqrt{\beta_{m_k}} \|A_{m_k} x + n_{m_k}\| \leq \sqrt{1+\beta_{m_k}} (H_{m_k,m} S_{m_k} x)$, ∀m,k
$p^T x = 0$
$\|G_m x\| \leq \sqrt{P_m}$, ∀m
with following notations $x_m = [w_{m_1}^H, \ldots, w_{m_{K_m}}^H]^H$, m = 1, ..., M, $x = [x_1^H, \ldots, x_M^H, 0]^H$, $n_{m_k} = [0, \ldots 0, \sigma_{m_k}]^T$, $S_{m_k} = [0 \; 0 \; \ldots \; I_{T_m} \ldots 0]$, $A_{m_k} = diag\left(\underbrace{h_{m_k,1}, \ldots, h_{m_k,1}}_{K_1}, \ldots, \underbrace{h_{m_k,M}, \ldots, h_{m_k,M}}_{K_M}, 0\right)$, $G_{m_1} = [S_{m_1}^H \ldots S_{m_{K_m}}^H]^H$, $\beta_{m_k} = 2^{a_{m_k}} - 1$, $p = [0, \ldots 0, 1]^T$ wherein $\sigma_{m_k}$ is a standard deviation of the zero-mean complex Gaussian additive noise at the $m_k$-th user station, $I_{T_m}$ denotes a identity matrix with dimension $T_m$.

3. The monotonic optimization, as recited in claim 1, wherein the sensible search scheme in the Step 6 is:
denoting $l_{ab}$ as a line connecting a and b ; finding an intersection point c on the hyperplane {r|f(r)=$f_{min}$} with the line $l_{ab}$, $$c = a + (b-a) \times \frac{f_{min} - f(a)}{f(b-a)}$$

checking feasibility of c via the problem φ(a) in the Step 5 with a=c ;
wherein if φ(c) is feasible, a bisection line search is conducted along the line $l_{cb}$ to obtain the intersection point on a Pareto-boundary; given a line search accuracy δ, two points $r_{min}$ and $r_{max}$ are acquired; the partition point is set as r=$r_{max}$ while the lower bound is updated as $f_{min}=f(r_{min})$;
if φ(c) is infeasible, just set the partition point as r =c.

4. The monotonic optimization, as recited in claim 1, wherein the sequential partition method in the Step 7 comprises steps of:
i) firstly generating a set of K new vertices {$b^1, \ldots, b^{(K)}$} based on the partition point r , wherein $b^{(i)} = b - (b_i - r_i) e_i$, i=1, ..., K wherein a subscript i indicates an i-th element of a vector and $e_i$, is a vector with the i-th element being 1 and the others being 0;
ii) sorting the K vertices as {$b^{(i_1)}, \ldots, b^{(i_k)}$} in ascending order of the achievable weighted sum-rate, wherein $i_s$ denotes an original index of the s-th vertex; and iii) sequentially determining the corresponding vertices $\{a^{(i_1)}, \ldots, a^{(i_k)}\}$ as $$a^{(i_s)} = \begin{cases} a, & s = 1 \\ a^{(i_{s-1})} + (r_{i_{s-1}} - a_{i_{s-1}})e_{i_{s-1}}, & s > 1 \end{cases}.$$

(5)

\* \* \* \* \*